C. McKEE.
CORN SHELLER.
APPLICATION FILED MAY 13, 1910.

1,029,451.

Patented June 11, 1912.

3 SHEETS—SHEET 3.

Witnesses

Inventor
Charles McKee
By
H. A. Lacey, Attorneys.

UNITED STATES PATENT OFFICE.

CHARLES McKEE, OF MONTICELLO, ILLINOIS.

CORN-SHELLER.

1,029,451.	Specification of Letters Patent.	Patented June 11, 1912.

Application filed May 13, 1910. Serial No. 561,197.

*To all whom it may concern:*

Be it known that I, CHARLES McKEE, citizen of the United States, residing at Monticello, in the county of Piatt and State of Illinois, have invented certain new and useful Improvements in Corn-Shellers, of which the following is a specification.

My invention relates to power machines for shelling corn and particularly to that type of corn shelling apparatus in which a cylinder is used, and a concave in connection therewith, the cylinder and concave being mutually provided with teeth and the corn fed in at one end of the cylinder, the corn being shelled from the cob when passing between the cylinder and concave, and the cob and corn passing out to the other end of the cylinder upon suitable raddle-racks, whereby the corn and cobs are carried forward in the machine, the corn being separated from the cob and being discharged by any suitable elevating apparatus while the cobs pass on and are discharged on a stacking device.

Particularly, my invention has relation to the shelling cylinder and concave, and the object of the invention is to position the cylinder and concave relatively to the raddle-rack beneath which the shelled corn and cobs are discharged upon the extreme rear end of the raddle-rack, thus giving the full length of the raddle-rack for separating the corn from the cobs. This arrangement obviates the disadvantages incident to the type of sheller in which the shelled corn-cobs were discharged near the middle of the raddle-rack, thus reducing its separating capacity and preventing it from separating all the corn from the cobs before the cobs left the raddle-rack.

For a full understanding of the invention reference is to be had to the following description and accompanying drawings, in which:—

Figure 1:
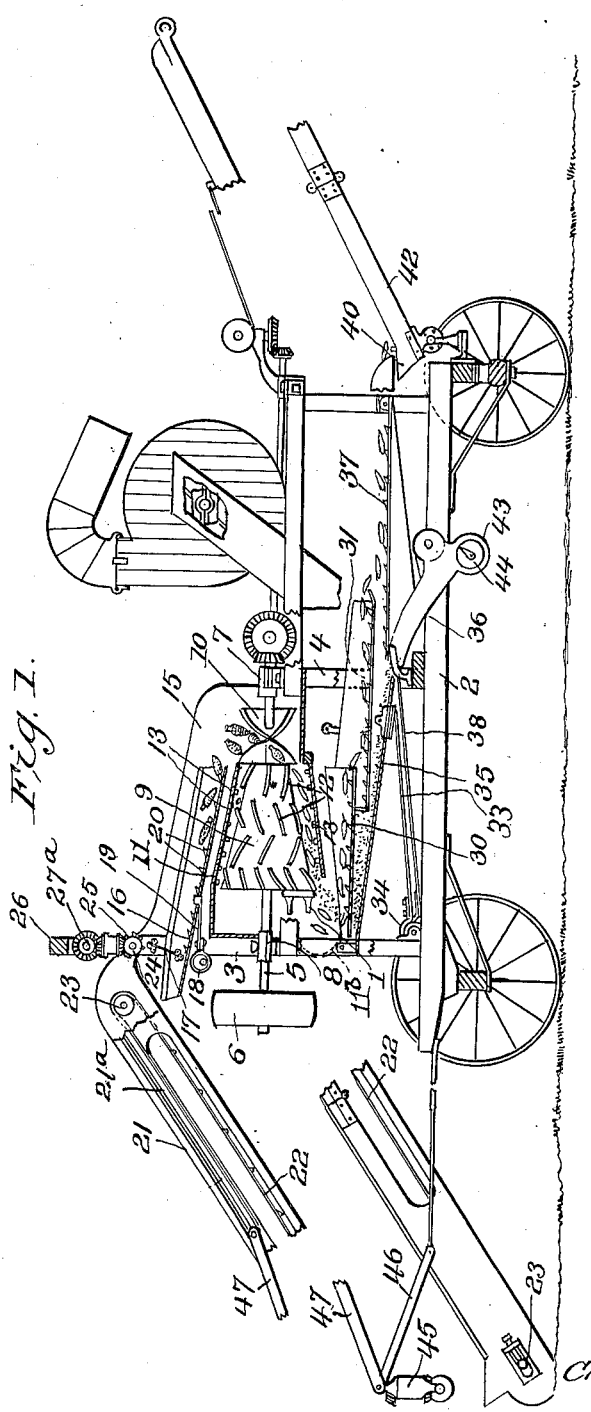
Figure 2:
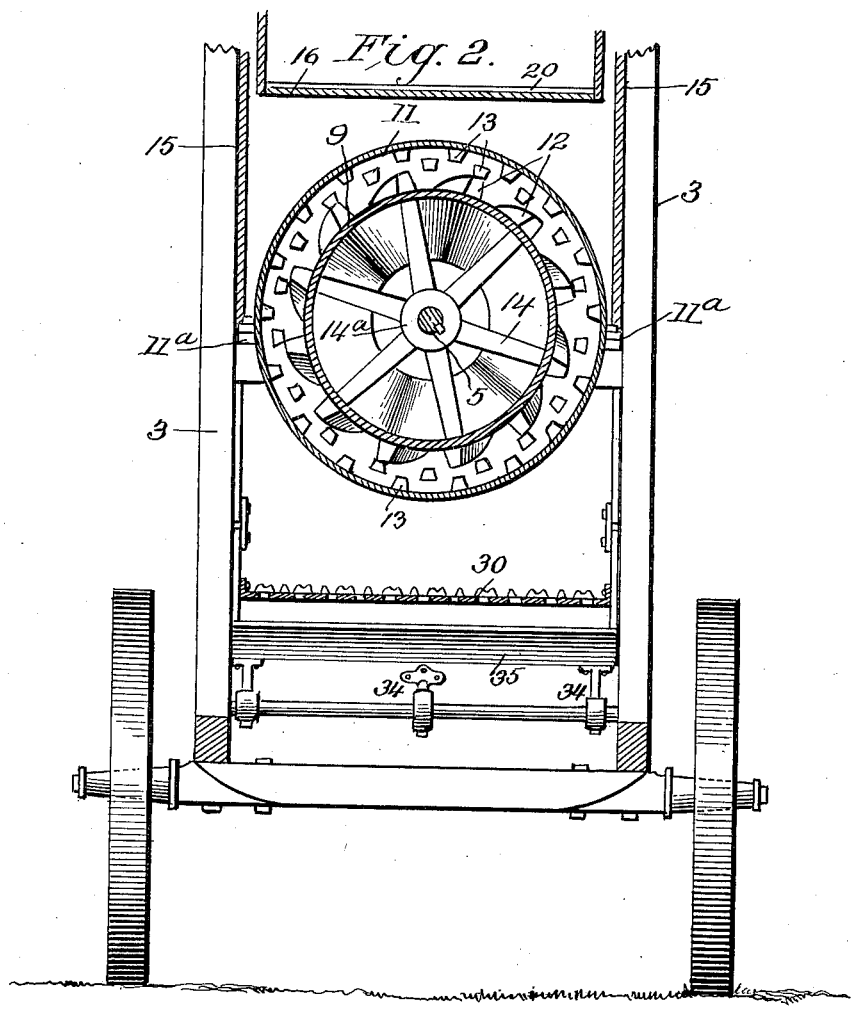
Figure 3:
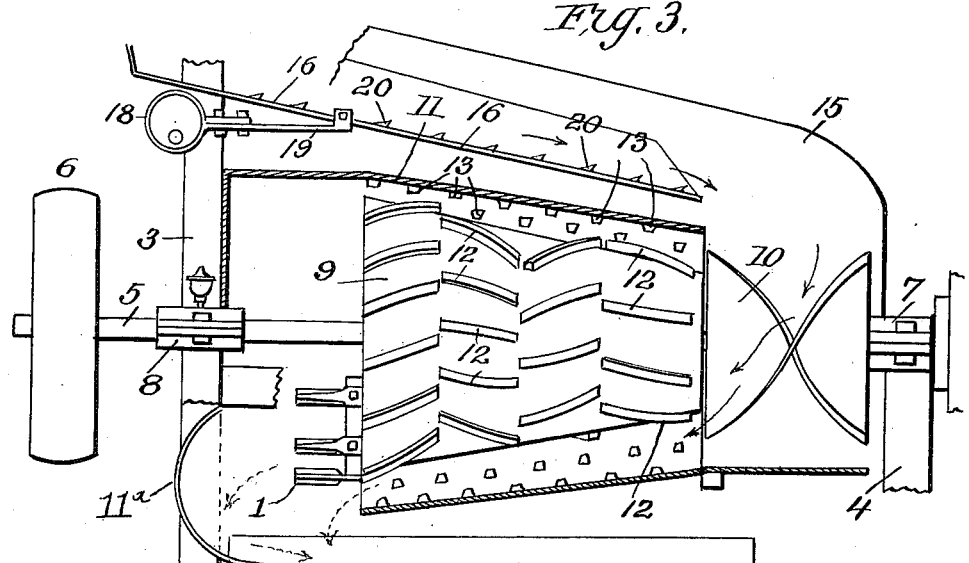
Figure 4:
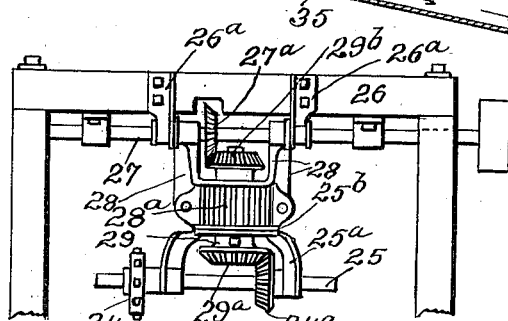
Figure 5:
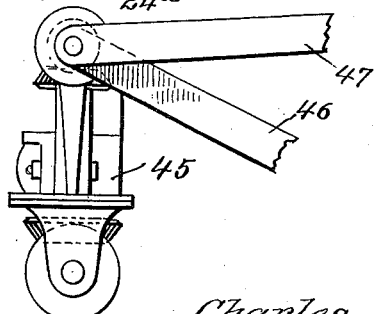

Figure 1 is a longitudinal vertical section of a corn sheller showing my improvement therein, the shelling cylinder being in elevation. Fig. 2 is an enlarged vertical transverse section through the shelling cylinder and its concave. Fig. 3 is an enlarged sectional view of the concave and the raddle-rack beneath, the cylinder and feed screw being shown in elevation. Fig. 4 is a front elevation of a universal gear operating the forward conveyer; and Fig. 5 is a side view of the lower universal gear which is used for the purpose of driving a corn drag belt.

Corresponding and like parts are referred to in the following description and indicated in all the views of the drawings by the same reference characters.

Referring to these drawings, 2 designates a wheeled frame of any suitable construction upon which the shelling and separating mechanism are to be supported. One end of the frame is provided with the uprights 3 and the middle of the frame is preferably formed with the uprights 4. These uprights support the longitudinally extending shaft 5, having the belt-wheel 6 at one end, the shaft, of course, passing through any suitable bearings 7 and 8 carried by the uprights. Mounted on the shaft 5 is the cylinder 9 which has the form of a frustated cone. The large end of this cylinder is at the rear end of the machine, while the small or feed end of the cylinder is directed toward the forward end of the machine. The cylinder 9 is contained within a casing or concave 11 which also has the form of a frustated cone, but tapering less than the cylinder 9 so that at the entrance end of the cylinder there will be a relatively large space between the cylinder and the concave, while at the discharge end of the cylinder and concave a comparatively small space is left. The cylinder is, of course, provided with a plurality of rows of teeth 12 arranged in alternate groups, the teeth of one group extending at an angle to the next succeeding group, and the teeth of one group having a staggered relation to the teeth of the next succeeding group. The concave 11 is provided at its delivery end and at its lower side with a series of spaced bars 1 which extend longitudinally of the concave and project beyond the delivery end thereof. These bars are designed to hold the cobs and prevent the same from being rolled around the delivery end of the concave 11 by the teeth 12 carried by the cylinder 9 when the kernels at the end of the cob have passed beyond the lowermost teeth 13 mounted upon the inner side of the concave 11. The bars 1 also hold the cobs in approximately horizontal positions during the final shelling action and thus prevent the end kernels from being crushed which might occur should the cobs tilt or slant in a downward direction as their ends are projected beyond the ends of the concave of the cylinder. The interior of the concave is also provided with a plurality of inwardly projecting teeth 13 also having a staggered relation with each other. The concave is supported on oppositely disposed, longitudinally extending side bars 11$^a$ mounted on the uprights 3 and 4. This is shown in Fig. 2, which also shows the cylinder 9 in section. The cylinder 9 is hollow and supported on the shaft 5 by means of spokes 14 extending from a central hub 14$^a$. Any desired arrangement, however, for supporting the concave or casing 11 may be used, and of course the particular form of the shelling cylinder may be modified. A curved guard 11$^b$ is mounted opposite the discharge end of the concave 11 and serves to receive the corn and direct it upon the raddle.

Extending upward on each side of the machine are the side boards 15, between which is mounted the reciprocating feed rack 16. This rack is supported by links 17 at the rear thereof and is given a reciprocating motion by means of an eccentric 18 actuated in any desired manner not shown, and connected to the rack 16 by means of a connecting rod 19. This connecting rod acts to support the forward end of the rack. Mechanism for supporting and reciprocating these racks is so well known that an extended description thereof is not necessary. The face of the rack is, of course, provided with upwardly and forwardly projecting teeth 20, whereby the corn-cobs with the corn thereon are fed toward the feed screw 10.

In order to carry the corn upward and feed it upon the rack 16 I preferably provide a conveyer frame 21, within which moves the conveyer belt 22, this belt passing around a shaft having a sprocket wheel 23, the shaft being located in the upper end of the frame 21. This sprocket wheel may be actuated in any suitable manner but is preferably driven from a sprocket wheel 24 mounted on a shaft 25 supported in bearings 25$^a$ extending downward from a rotatable ring plate 25$^b$. A shaft 27 is mounted in bearings 26$^a$ depending from a cross bar 26 on the frame 3, this shaft 27 carrying the beveled gear wheel 27$^a$. Mounted on a shaft 27 are the depending members 28 which carry at their lower ends a bearing 28$^a$ for a vertical shaft 29. This shaft carries at its upper end a beveled gear 29$^b$ which engages with the beveled gear 27$^a$, and at its lower end has a beveled gear 29$^a$ which engages with a beveled gear 24$^a$ on the shaft 25. It will be seen that the universal joint thus formed enables the shaft 25 to be swung at any desired angle without moving any other part of the machine, thus permitting the conveyer 2 to be shifted angularly as desired. Supported on the carrier 21 is a universal gear 45 for operating the usual corn drag belt. This gear 45 is supported on arms 46 which are pivoted to the sides of the conveyer trough 21 and are connected at the upper end to adjusting bars 47 whose end is provided with a pin moving in the slot 21$^a$. This construction is for the purpose of sliding the universal gear supports along the sides of the carrier elevator so that when the elevator is folded for the road the universal gear supports will carry the universal gear under the elevator.

At the discharge end of the cylinder 9 and concave 11, that is, at the extreme forward end of the machine, the corn which has been removed from the cobs by means of the teeth 12 and 13, and the corn-cobs are received on the reciprocating raddle-rack 30 which is perforated and provided with upwardly and forwardly projecting teeth. Forward of the rack 30 and on a slightly lower level, is the rack 31 of the same character as the rack 30, and also provided with upwardly and rearwardly projecting teeth. These racks 30 and 31 are mounted in any suitable frame and are reciprocated by means of a connecting rod 33 connected to an eccentric 34. Any other suitable mechanism for giving a reciprocating motion to these racks may be used. A bottom 35 is provided beneath the raddle-racks 30 and 31 upon which the shelled corn drops, and by which it is conducted rearward and discharged upon a chute 36. The cobs are discharged from the rack 30 on to the rack 31, and from thence to a reciprocating rack 37 which is reciprocated by means of an eccentric rod 38. Any other suitable means may be used, however, for reciprocating the rack 37. The rack 37 discharges the cobs from which the corn has been shelled into a hopper 40 from which the cobs pass to a conveyer 41 carried in a frame 42, which conveyer carries the shelled cobs upward to the upper end thereof where they are discharged upon a stack. Any ordinary means may be provided for raising or lowering the frame 42, or for giving it a wholly reciprocating motion so as to spread the cobs along the stack. The shelled corn on the floor 35 is discharged into the chute 36 which carries the corn to a conveyer casing 43 in which is mounted the ordinary screw conveyer, indicated by the numeral 44 which carries the corn laterally beneath the machine to any suitable hoisting apparatus, the screw conveyer being operatively connected to a source of power as is usual in devices of this character. It will be understood that the racks 30, 31 and 37, and the means for operating them as well as the conveyer 44, have been shown conventionally in the drawing for the reason that all these parts are well known and are such as is usually found in corn-shelling apparatus.

The important part of my invention lies in the peculiar disposition of the shelling cylinder 9 and concave. As before stated, the shelling cylinder and concave have heretofore been reversed in position so that the receiving end of the cylinder and concave was disposed directly over the rear end of the raddle-rack 30, and directly beneath the upper end of the ear corn carrier elevator 21, the discharge end of the cylinder and concave being located toward the middle of the raddle-rack 30. By changing the position of the cylinder and concave and providing the reciprocating feed rack 16 and the feed screw 10, I provide a means whereby the shelled corn may be discharged upon the extreme forward end of the raddle-rack 30, and thus the corn will be carried along the whole length of the raddle-rack, thus giving ample chance for the corn to be separated from the cobs before the cobs pass on to the rack 31.

What is claimed is:

1. In a corn sheller, a journaled shaft, a cylinder mounted thereon, a concave surrounding the cylinder, a feed screw mounted upon the shaft at the receiving end of the concave, a raddle rack located under the concave and having its receiving end portion projecting beyond the delivery end of the concave, and a feed rack located above the concave and having its delivery end located above the feed screw, the said racks being located one above the other with the concave and cylinder between them.

2. In a corn sheller, a cylinder journaled for rotation, a concave surrounding the same, an ear feeding rack located above the concave, an ear turning means located at the end of the cylinder and adapted to receive ears from the ear feeding rack and present the same endwise between the cylinder and concave, and a raddle rack located below the concave and having its receiving end projecting beyond the delivery end of the concave, said racks being located one above the other with the concave and cylinder between them.

3. In a corn sheller, a cylinder journaled for rotation, a concave surrounding the same, means for feeding ears between the concave and the cylinder, spaced teeth carried at the delivery end of the concave at the lower portion thereof and extending approximately longitudinally of the concave and projecting beyond the delivery end thereof, and a raddle rack located below the concave and having its receiving end portion projecting beyond the delivery end of the concave.

In testimony whereof, I affix my signature in presence of two witnesses.

CHARLES McKEE. [L. S.]

Witnesses:
W. L. PLANKENHORN,
R. B. WEDDLE.

---

Copies of this patent may be obtained for five cents each, by addressing the "Commissioner of Patents, Washington, D. C."